United States Patent [19]

Völbel et al.

[11] Patent Number: 4,624,719
[45] Date of Patent: Nov. 25, 1986

[54] PROCESS AND DEVICE FOR LAMINATING OF SHEET TO SHEET

[75] Inventors: Klaus-Dieter Völbel; Willi Trosdorff, both of Düsseldorf, Fed. Rep. of Germany

[73] Assignee: Tuenkers Maschinenbau GmbH, Ratingen, Fed. Rep. of Germany

[21] Appl. No.: 653,911

[22] Filed: Sep. 24, 1984

[51] Int. Cl.$^4$ .................. B30B 3/02; B30B 15/04
[52] U.S. Cl. .................. 156/60; 100/93 RP; 100/153; 156/539; 156/556; 156/580
[58] Field of Search .............. 156/364, 555, 556, 539, 156/60, 580; 271/176, 182, 200, 201; 100/93 RP, 153

[56] References Cited

U.S. PATENT DOCUMENTS

| | | | |
|---|---|---|---|
| 2,725,155 | 11/1955 | Fitch et al. | 156/364 |
| 3,567,047 | 3/1971 | Clausen et al. | 271/176 |
| 3,671,363 | 6/1972 | Bruder | 156/556 |
| 3,816,866 | 6/1974 | Miaskoff et al. | 156/364 |
| 3,970,506 | 7/1976 | Kwan et al. | 156/364 |
| 4,189,271 | 2/1980 | Hasegawa | 156/351 |
| 4,493,743 | 1/1985 | Lunding | 156/364 |

FOREIGN PATENT DOCUMENTS 3315815  11/1984  Fed. Rep. of Germany .

Primary Examiner—Michael Wityshyn
Attorney, Agent, or Firm—Antonelli, Terry & Wands

[57] ABSTRACT

The invention relates to a process and a device for laminating of one sheet on the other sheet. The sheets to be laminated are underpinned and guided to an abutment, so that no breakdowns can occur even with unstable paper.

3 Claims, 3 Drawing Figures and# PROCESS AND DEVICE FOR LAMINATING OF SHEET TO SHEET

BACKGROUND OF THE INVENTION

The invention relates to a process for laminating sheet on sheet, whereby at least one of the sheets is provided with adhesive on one side thereof and the other sheet is laminated thereon and that the forward esdges of the sheets are fed contactless and superimposed with each other, after a certain setting time of the applied adhesive. They are then aligned against an abutment which acts on the forward edges of the sheets and are retained at that abutment and thereafter a movement is imparted to at least one of the sheets in a transverse direction with respect to the feeding direction in such a manner that the sheets are brought together at the area of their forward edges and the abutment is removed from the feeding path of the sheets, and thereafter the sheets are laminated with each other and removed.

In furtherance, the invention relates to a device for performing the process in accordance with the invention.

A process and a device of the aformentioned type are known from DE-OS No. 15 11 291. However, it is disadvantageous that in the aligned position the superimposed sheets to be laminated extend with their front edges beyond their feeding path sides against the abutment. Therefore, a free space exists between the superimposed conveyor paths and the abutment. This could result in the formation of folds, deformations, in other words, in disturbances and breakdowns, in particular with unstable paper.

SUMMARY OF THE INVENTION

It is an object of the invention to provide a process wherein two or more sheets can be aligned in a plane manner, e.g., without folds or bubbles as well as matching with each other, e.g., edge on edge contactless with respect to each other, whereby no danger of breakdowns exist, even with unstable paper.

In furtherance, it is an object of the invention to provide an advantageous laminating device for performing the process in accordance with the invention.

When using the process in accordance with the invention the sheets are underpinned and guided directly to the plane of the abutment, so that even unstable sheets cannot bend any longer in the area of their front edges. Accordingly, breakdowns can no longer be expected. Moreover, unstable paper sheets can be laminated with each other in a flat and matching manner.

The conveyor path portion in the feeding direction is designed movably in accordance with the inventive laminating device. Accordingly, this portion can be brought directly against the abutment, so that the sheet which comes from above can be guided and underpinned from this conveor portion until it engages the abutment. Only at the time when the sheets are to be laminated onto each other one can remove this conveyor path portion, whereupon a vertically movable feed roller pushes the edge of the upper sheet against the lower sheet which is provided with the adhesive, so that the laminating occurs with a subsequent further moving and removal of the sheet.

The feeding of the upper sheet, which is not provided with the adhesive, is performed in an acute angle against the feeding path of the lower sheet, which is provided with the adhesive. Only at a slight distance away from the abutment is the edge of the sheet deflected into a horizontal, so that a surface section is available at the edge during the moving away of the movable conveyor part which can be pressed directly and fittingly against the lower sheet, which is provided with adhesive, by the feed roller.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
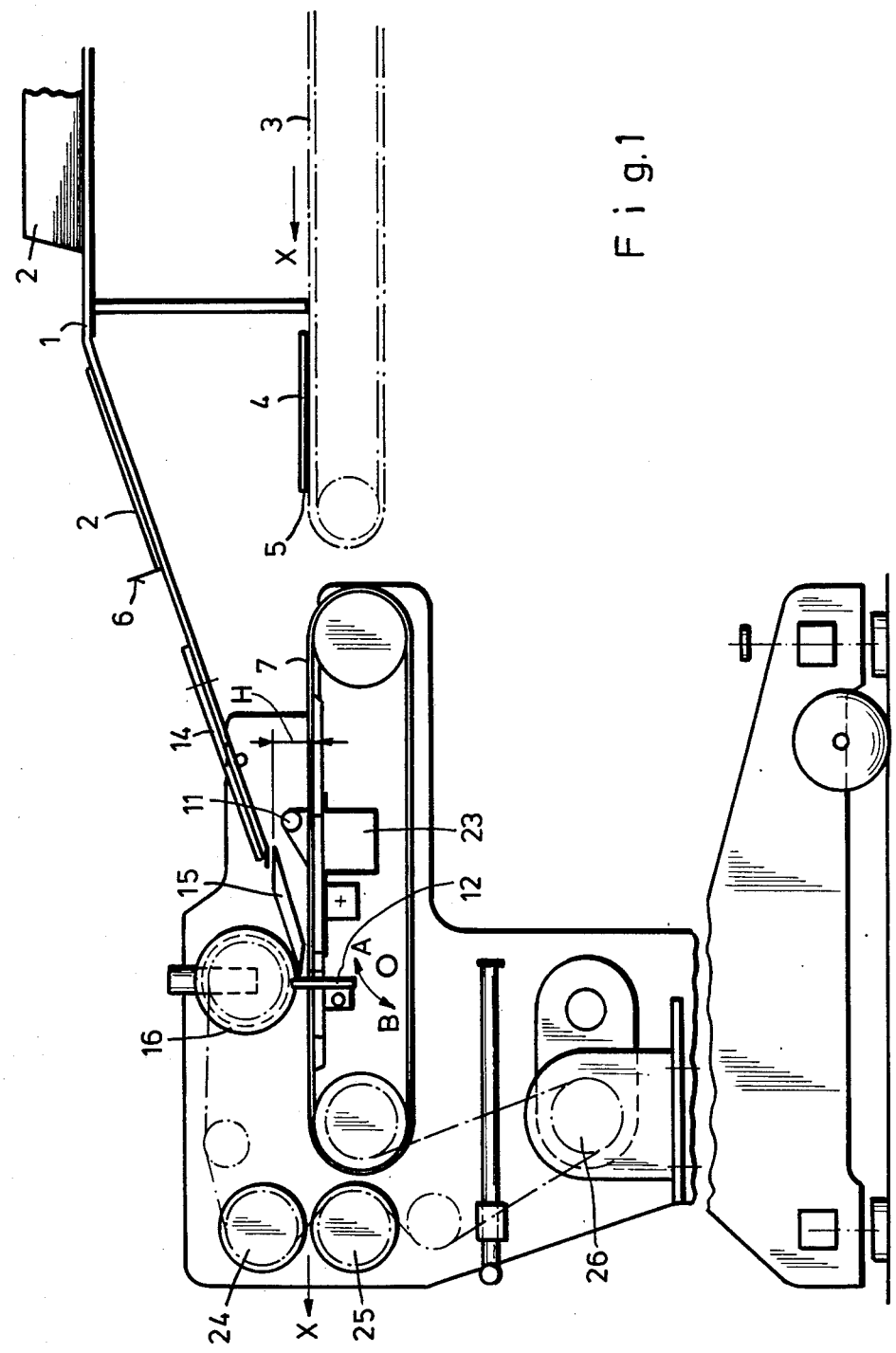
FIG. 1 A laminating device in accordance with the invention in a side view.

The laminating station illustrated in FIG. 1 is provided with a removable feed table 1, whereby a pile of sheets 2 are disposed on the horizontal portion thereof. A conveyor 3 is provided below this pile of sheets 2, whose feed direction is designated with X and on which the generally heavier sheets 4 are fed which are covered on the surface with a very thin adhesive layer in an adhesive station, not shown. The adhesive layered sheet 4 has a front edge 5. The front edge of the upper sheet 2 is designated with the numeral reference 6.

Figure 3:
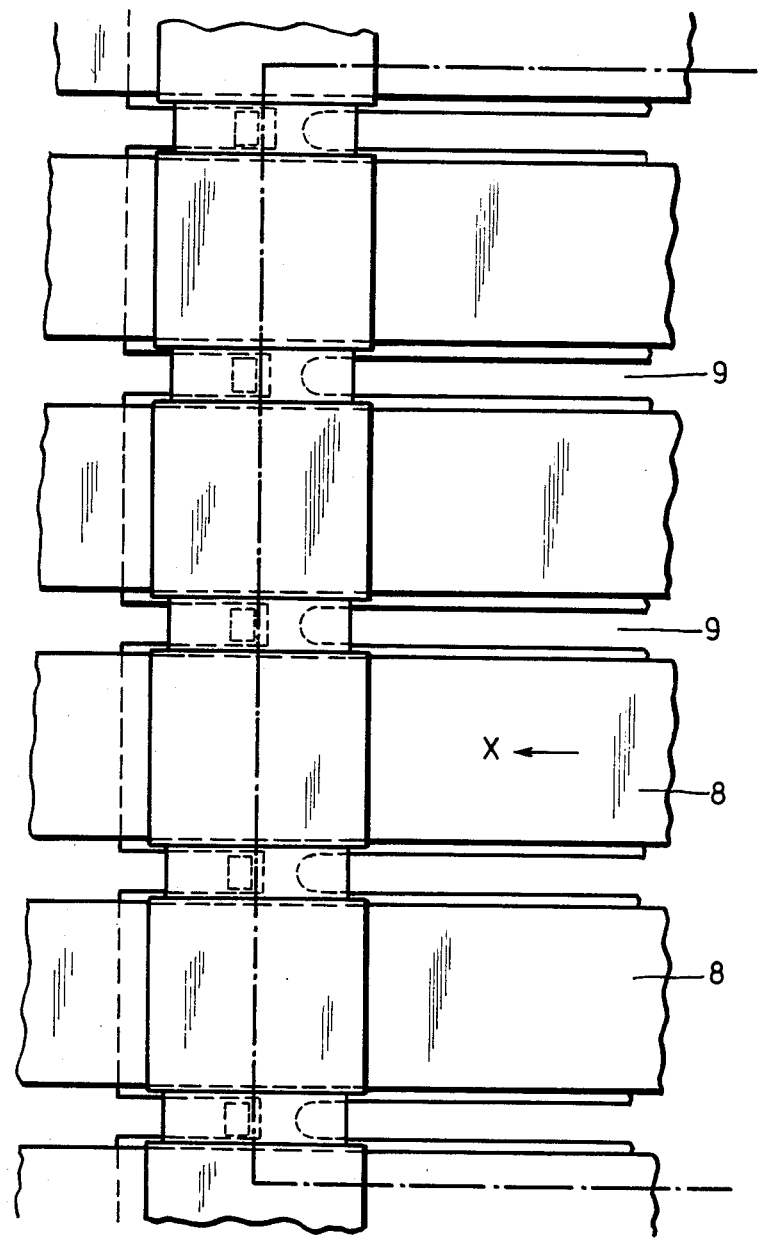
FIG. 3 a plan view on the conveyor in accordance with FIG. 2

The adhesive layered sheet 4 is moved over the sufficiently long conveyor path of conveyor 3, which consists of endless conveyor belts, to a horizontal conveyor path 7 which is provided with parallel and at a distance spaced apart from each other extending endless belt like conveyors 8 (FIG. 3). The space existing between these conveyor belts 8 is designated with the reference numeral 9 (FIG. 3).

The lower sheets 4 are fed to the area of a lateral alignment device 11 of a feed table 10 which consists of at least an abutment bar extending upwardly from conveyor path 7 and which aligns the lower sheets 4 in a transverse direction. During the further transport by the conveyor belts 8, the lower sheets 4 abut with their front faces 5 against an abutment 12 which extends upwardly from the conveyor path 7, whereby the abutment is moveable by means of a motor in direction A and B in a reciprocating manner in such a way that it can be moved away from the conveyor path.

The conveyor path 13 for the upper sheet 2 which is inclined in an acute angle downwardly with respect to the conveyor path 7 ends in the height range H above conveyor path 4 for the lower sheets 4. The conveyor path 13 is also provided with a lateral alignment device 14 at its end region for a lateral aligning of upper sheets 2.

Subsequent to the conveyor path 13 is a movable conveyor path portion, in the following called a separating wedge 15, which moves with the same incline and in the same plane as conveyor path 13, so that the sheets 2 are always moved without bending and are underpinned and guided at their lower side until they abut with their front edge 6 also, above the lower sheets 4, against abutment 12. The transport on the conveyor path 13 may be performed by means of a friction conveyor.

Figure 2:
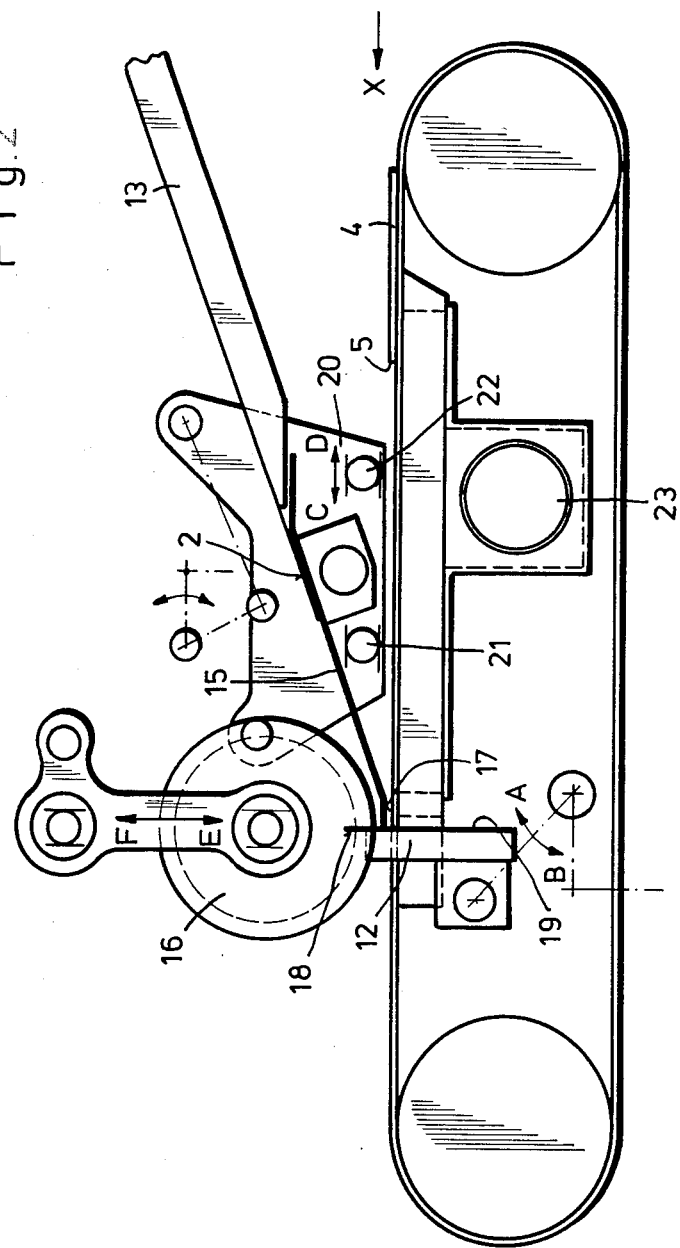
FIG. 2 a sectional illustration from FIG. 1 in an enlarged scale.

As can be seen in FIG. 2, the conveyor path of the separating wedge 15 extends almost to the area of abutment 12 with the same acute angle as conveyor path 13. The conveyor path of the separating wedge 15 is already deflected into a horizontal at a relative low distance, that is, below a feed roller 16 at 17 and preferably abuts with its front edge 18 (FIG. 2) against the abutment face 19 of the abutment 12, so that the upper sheet 2 is underpinned and guided by the separating wedge 15 to the plane of abutment face 19.

The separating wedge 15 is provided with a guide part 20 which is guided horizontally by means of guides 21 and 22 in direction C or D. In this manner it is possible to move the separating wedge 15 in a limited direction D away from abutment face 19, whereupon the front edges 5 and 6 of lower sheet 4 or upper sheet 5 can be brought together in a flat and matching manner. It is therefore obvious that even with an unstable paper a bending of the upper sheet 2 is not possible.

The feed roller 16 is reciprocally driven by a motor in the direction E or F, respectively.

The sheet 4 is retained on the conveyor belts 8 by a suction box 23, after the lateral aligning of the lower sheet 4 by the lateral alignment device 11 and after the movement of this sheet 4 with its front edge 5 against the abutment face 19. This vacuum can become effective through the spaces 9 between the conveyor belts 8 and the lower side of sheet 4.

After the front edges 5 and 6 were brought into a superimposed position at the abutment face 19, the separating wedge 15 is moved away in direction D. Simultaneously, or a short time thereafter the feed roller 16 is driven in direction E and pushes the upper sheet 2 in a matching and flat manner against the lower sheet 4, whereupn the laminating of the two sheets 2 and 4 is performed. They move in the direction X through the laminating device and through the motor driven feed rollers 24 and 25 which are driven by a controllable drive 26.

So that the sheets 2 and 4 can be moved away in direction X and be laminated onto each other, abutment 12 is pivoted away in direction B by means of a motor simultaneously or during the downward movement of the feed roller 16.

After the removal of the laminated sheets the feed roller 16 is moved back in direction F to its initial position (FIG. 2). In addition, the separating wedge 15 is moved back into its initial position of FIG. 2, by a movement in direction C. Furthermore, the abutment 12 pivots in direction A also into its abutment position illustrated in FIG. 2, whereupon the operating cycle is repeated.

It will be understood that each of the elements described above, or two or more together, may also find a useful application in other types of devices for laminating sheets differing from the types desccribed above.

While the invention has been illustrated and described as embodied in a process and device for laminating sheets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a process for laminating sheet on sheet, wherein at least one of the sheets is provided with adhesive on one side thereof and the other sheet is laminated thereon and the forward edges of the sheets are fed contactless and superimposed with each other, after a certain setting time of the applied adhesive, they are aligned against an abutment having an abutment plane and which acts on the forward edges of the sheets so that they are retained at that abutment and thereafter a movement is imparted to at least one of the sheets in a transverse direction with respect to the feeding direction in such a manner that the sheets are brought together at the area of their forward edges and the abutment is removed from the feeding path of the sheets, and thereafter the sheets are laminated with each other and removed, the improvement comprising providing means for underpinning said sheets, extending in the feeding direction up to said abutment so that the sheets are underpinned and guided to the abutment plane of said abutment which acts against the forward edges, and bending of unstable sheets in the region of their forward edges is prevented.

2. A device for laminating sheet on sheet wherein at least one of the sheets is provided with adhesive on one side thereof and the other of the sheets is laminated thereon, the device comprising at least two feeding conveyors which feed the sheets to be laminated against an abutment, said conveyors extending at an acute angle with respect to each other; and means for underpinning said sheets, extending in a feeding direction up to said abutment so that the sheets (2, 4) are underpinned and guided to an abutment plane (19) of said abutment (12), wherein an upper conveyor (13) of said feeding conveyors consists of a plurality of conveyor parts, of which a front conveyor part (15) in the feeding direction forms said underpinning means and is movable in a limited manner against the other part of the upper conveyor (13), which is stationary.

3. The device in accordance with claim 2, wherein a conveyer path of said front conveyor part (15) runs for the most part of its length, which is in contact with said other sheet (2), in the plane of the stationary conveyor part (13) and deflects into a horizontal short of said abutment (12).

* * * * *